United States Patent
Tsai et al.

(10) Patent No.: US 7,461,198 B2
(45) Date of Patent: Dec. 2, 2008

(54) SYSTEM AND METHOD FOR CONFIGURATION AND MANAGEMENT OF FLASH MEMORY

(75) Inventors: Yi-Lin Tsai, Kaohsiung (TW); Tei-Wei Kuo, Taipei (TW); Jen-Wei Hsieh, Taipei (TW); Yuan-Hao Chang, Tainan (TW); Hsiang-Chi Hsieh, Taipei (TW)

(73) Assignee: Genesys Logic, Inc., Taipei (TW)

( * ) Notice: Subject to any disclaimer, the term of this patent is extended or adjusted under 35 U.S.C. 154(b) by 214 days.

(21) Appl. No.: 11/490,049

(22) Filed: Jul. 21, 2006

(65) Prior Publication Data

US 2007/0038802 A1    Feb. 15, 2007

(30) Foreign Application Priority Data

Jul. 29, 2005    (TW) ............................. 94125951 A

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)

(52) U.S. Cl. .................... 711/103; 711/202; 711/203; 711/208; 711/209; 365/185.11; 365/185.33; 365/230.03

(58) Field of Classification Search ............... 711/103
See application file for complete search history.

(56) References Cited

U.S. PATENT DOCUMENTS

| | | | | |
|---|---|---|---|---|
| 5,734,816 A | * | 3/1998 | Niijima et al. | 714/8 |
| 5,937,425 A | * | 8/1999 | Ban | 711/103 |
| 6,591,330 B2 | * | 7/2003 | Lasser | 711/103 |
| 6,639,843 B2 | * | 10/2003 | Miyauchi | 365/185.29 |

* cited by examiner

*Primary Examiner*—Kevin L Ellis
*Assistant Examiner*—Ryan Bertram
(74) *Attorney, Agent, or Firm*—Rosenberg, Klein & Lee

(57) ABSTRACT

A system and a method for configuration and management of flash memory is provided, including a flash memory, a virtual memory region, and a memory logical block region. The flash memory includes a plurality of physical erase units. Each physical erase unit is configured to include at least a consecutive segment, and each segment is configured to include at least a consecutive frame. Each frame is configured to include at least a consecutive page. Each virtual memory region is configured to include a plurality of areas, and each area is configured to include at least a virtual erase unit. The memory logical block region is configured to include a plurality of clusters, and each cluster includes at least a consecutive memory logical block. By forming correspondence among the physical erase unit, segment, frame, page, virtual erase unit, area, memory logical block and cluster to control the data access to the flash memory, the present invention achieves the reconfiguration and management of memory consumption and access efficiency for the flash memory.

7 Claims, 7 Drawing Sheets

SYSTEM AND METHOD FOR CONFIGURATION AND MANAGEMENT OF FLASH MEMORY

BACKGROUND OF THE INVENION

1. Field of the Invention

The present invention relates to a system and a method for configuration and management of flash memory and, more particularly, to a system and a method for managing flash memory access and reconfiguring data access control unit of flash memory.

2. The Related Arts

The flash memory is widely used in storing multimedia data, such as digital images or audio data. However, conventional methods of data access and management of flash memory include the following two categories.

The first category of methods employs a large-size lookup table. The lookup table records the mapping of a logical block address (LBA) to a physical address. This provides good data access efficiency because the mapping of an LBA to a physical address can be easily found in the lookup table. The drawback is that this method requires a large amount of memory for the lookup table. For example, for a 512 MB flash memory with the block size of 512 bytes, there will be 1,048, 576 LBAs. If the system uses four bytes to represent a physical address, the method requires 4 MB of physical memory to store the lookup table.

The second category of methods also employs a lookup table, but the lookup table only records the mapping of logical erase unit to a physical erase unit. When an LBA is mapped to a physical address, the LBA is divided into two parts. The first part is the logical erase unit address, and the second part is the offset within the logical erase unit. For example, if a logical erase unit can store 32 logical blocks, the logical erase unit address is the quotient of the LBA divided by 32, and the offset is the modulo of the LBA divided by 32. Then the logical erase unit address is mapped to a physical erase unit address according to the lookup table, which is added with the offset to obtain the physical address mapping to the LBA. This method greatly reduces the memory required by the lookup table. However, the drawback is that the data access efficiency is poor because the entire data in the writen[T1] erase unit must be copied to an empty erase unit and then the data is writen to the corresponding location within the erase unit. Finally, the data in the original erase unit is erased. Because the flash memory takes much time in copying and erasing the data, the efficiency is reduced.

U.S. Pat. No. 5,937,425 disclosed a method called NFTL method. The NFTL method is a variation of the above second category of methods. In the NFTL method, a logical erase unit is mapped to one or more physical erase units, and all the physical erase units mapped to the same logical erase unit are arranged into a linked list. When the data is to be written to a logical block, the NFTL method uses the above method to find the corresponding logical erase unit and the corresponding linked list. Then, a search is conducted from the beginning of the linked list to check whether the corresponding offset of that physical erase unit has been written. If so, the next physical erase unit is checked. This repeats until a physical erase unit whose corresponding offset has never been written before is found, and the data is written to that address. If the corresponding offset in all the physical erase units in the linked list has been written, a new empty physical erase unit is added to the linked list, and the data is written to the corresponding offset in the new added physical erase unit. Similarly, when a data is to be read from a logical block, the method must find the corresponding linked list and start the search. The search is for the address that has been written before, which indicates the data is most recent, and then the data is read. In the NFTL method, a search must always be conducted for both read and write requests. Therefore, the data access efficiency is also poor when the linked list is long.

SUMMARY OF THE INVENTION

The aforementioned conventional methods have two extreme scenarios. The first scenario shows good data access efficiency but large memory consumption, while the second scenarios shows small memory consumption but poor data access efficiency. The present invention provides a system and a method that is between the two extreme scenarios, and also provides parameters of the data access basic control units for configuring between efficiency and memory consumption.

Therefore, the primary object of the present invention is to provide a system and a method for configuration and management of flash memory, including a flash memory, a virtual memory region, and a definition and configuration of basic data access control units of a memory logical block region so that the data access efficiency and memory consumption can be improved.

Another object of the present invention is to provide a system and a method for configuration and management of flash memory where the flash memory, the virtual memory region, and the memory logical block region are configured to include a plurality of data access basic control units, including physical erase units, segments, frames, pages, virtual erase units, areas, memory logical blocks, and clusters. By adjusting among the basic control units, the present invention configures and manages the flash memory required for data access control and the data access efficiency to achieve the optimal performance for both memory consumption and access efficiency.

To achieve the aforementioned objects, the present invention provides a system for configuration and management of flash memory, including a flash memory, a virtual memory region, and a memory logical block region. The flash memory includes a plurality of physical erase units. Each physical erase unit is configured to include at least a consecutive segment, and each segment is configured to include at least a consecutive frame. Each frame is configured to include at least a consecutive page. The virtual memory region is configured to include a plurality of areas, and each area is configured to include at least a virtual erase unit. The memory logical block region is configured to include a plurality of clusters, and each cluster includes at least a consecutive memory logical block. By forming correspondence among the physical erase unit, segment, frame, page, virtual erase unit, area, memory logical block and cluster to control the data access to the flash memory, the present invention achieves the reconfiguration and management of memory consumption and access efficiency for the flash memory.

The method of the present invention comprises the following steps:

(a) defining a relationship among a flash memory, a virtual memory region and a memory logical block region according to the logical block address of the write request to the flash memory[T2];

(b) defining the data access basic control units of the flash memory, including physical erase unit, segment, frame, page;

(c) defining the data access basic control units of the virtual memory region, including virtual erase unit, and area;

(d) defining the data access basic control units of the memory logical block region, including cluster and logical block;

(e) constructing an erase unit table, a cluster table and a free segment table according to the relationship among the physical erase unit, segment, virtual erase unit, area, logical block and cluster; and (f) processing data access according to the relationship in the erase unit table, cluster table and free segment table.

Through the method of the present invention, the data access efficiency and the memory consumption for the flash memory can be adjusted and managed to achieve the optimal performance.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE INVENTION

Figure 1:
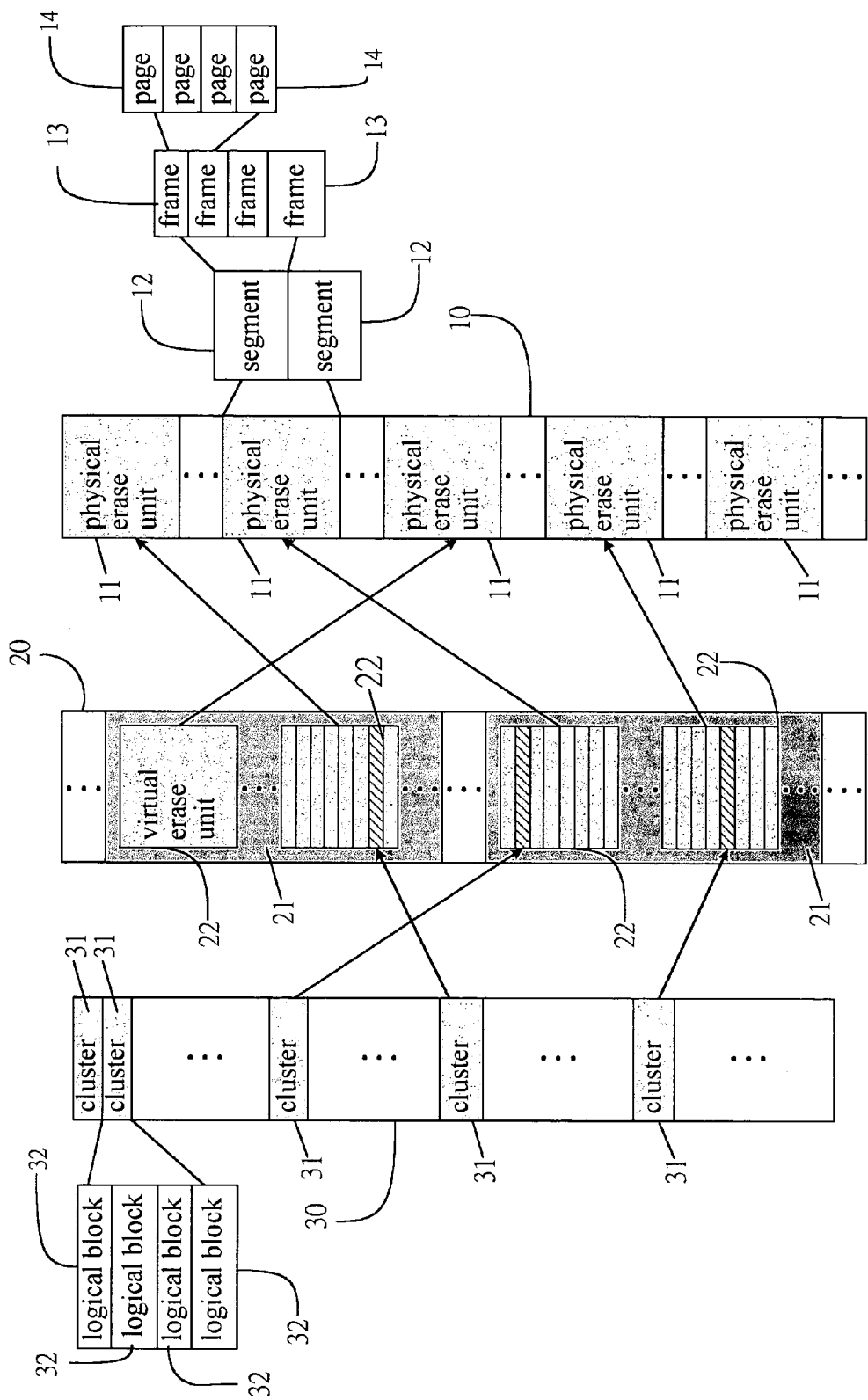
FIG. 1 is a system block diagram of the present invention.

With reference to the drawings, and in particular to FIG. 1, which shows a block diagram of a system of configuration and management of the flash memory of the present invention, the system 100 comprises a flash memory 10, a virtual memory region 20 and a memory logical block region 30. The flash memory 10 includes a plurality of physical erase units 11. Each physical erase unit 11 is configured to include at least a consecutive segment 12, each segment 12 is configured to include at least a consecutive frame 13, and each frame 13 is configured to include at least a consecutive page 14. The physical erase unit 11 and the page 14 are the basic data access units originally defined in the flash memory 10. The segment 12 and the frame 13 are the newly defined basic data access control units for the flash memory 10, and the definition and configuration can be performed during the formatting of the flash memory 10. That is, the segment 12 and the frame 13 can be incorporated into the flash memory formatting software or access control hardware, such as card reader.

The virtual memory region 20 exists in the access control software or hardware of the flash memory 10, such as the card reader or the card-reading control software of the electronic host.[T3] The virtual memory region 20 is configured to include a plurality of areas 21, and each area 21 is configured to include at least a virtual erase unit 22. The area 21 and the virtual erase unit 22 are the newly defined basic data access control units for the flash memory 10, and the definition and configuration of area 21[T4] can be performed during the formatting of flash memory. That is, the area 21 and the virtual erase unit 22 can be incorporated into the flash memory formatting software or access control hardware, such as card reader.

The memory logical block region 30 is the logical block addresses of the flash memory 10, to which the data access requests refer. The memory logical block region 30 is configured to include a plurality of clusters 31, and each cluster 31 includes at least a consecutive memory logical block 32. The cluster 31 is the newly defined basic data access control unit for the flash memory 10, and the definition and configuration can be performed during the formatting of flash memory. That is, the cluster 31 can be incorporated into the flash memory formatting software or access control hardware, such as card reader.

The mapping relationship among the flash memory 10, the virtual memory region 20, and the memory logical block region 30 is shown in FIG. 1. However, the mapping relationship is not limited to FIG. 1. Other equivalent mapping relationship is also within the scope of the present invention. Each cluster 31 of the memory logical block region 30 maps to a virtual erase unit 22 of the corresponding area 21 in the virtual memory region 20. Each virtual erase unit 22 of each area 21 maps to a physical erase unit 11 of the flash memory 10. Through the relationship among the basic control units defined for the flash memory 10, the virtual memory region 20, and the memory logical block region 30, such as the physical erase unit 11, the segment 12, the frame 13, the page 14, the area 21, the virtual erase unit 22, the cluster 31 and the logical block 32, all the read or write requests to a logical block 32 in the memory logical block region 30 can be mapped to read or write operation to a frame[T5] 13 in the flash memory 10. Through the reconfiguration of the size of all the basic control units, such as the physical erase unit 11, the segment 12, the frame 13, the page 14, the area 21, the virtual erase unit 22, the cluster 31 and the logical block 32, the data access efficiency and the memory consumption of the flash memory 10 can be adjusted to achieve higher performance.

Figure 2:
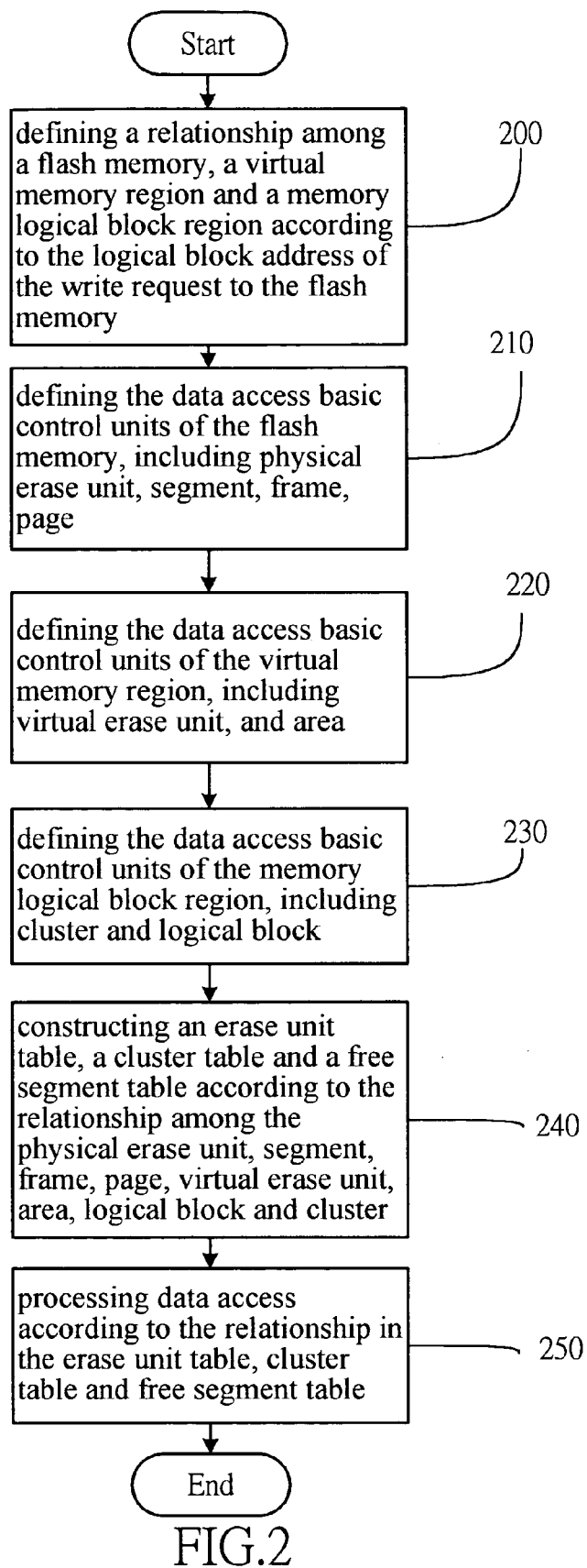
FIG. 2 is a flowchart of the method of the present invention.

FIG. 2 shows a method of configuration and management for flash memory of the present invention, including the following steps of:

(200) defining a relationship among a flash memory, a virtual memory region and a memory logical block region according to the logical block address of the write request to the flash memory[T6]; that is, defining the flash memory 10, the virtual memory region 20, and the memory logical block region 30 according to the system block diagram of FIG. 1;

(210) defining the data access basic control units of the flash memory, including physical erase unit, segment, frame, and page; that is, defining the physical erase unit 11, the segment 12, the frame 13, and the page 14 according to the structure of the flash memory 10 of FIG. 1;

(220) defining the data access basic control units of the virtual memory region, including virtual erase unit and area; that is, defining the area 21 and the virtual erase unit 21 according to the structure of the virtual memory region 20 of FIG. 1;

(230) defining the data access basic control units of the memory logical block region, including cluster and logical block; that is, defining the cluster 31 and the logical block 32 according to the structure of the memory logical block region 30 of FIG. 1;

(240) constructing an erase unit table, a cluster table and a free segment table according to the relationship among the physical erase unit, segment, virtual erase unit, area, logical block and cluster; that is, constructing an erase unit table 40, a cluster table 50 and a free segment table 60 (shown in FIGS. 3 and 4) according to the relationship among the physical erase unit 11, the segment 12, the frame 13, the page 14, the area 21, the virtual erase unit 22, the cluster 31 and the logical block 32; and (250) processing data access according to the relationship in the erase unit table, cluster table, and free segment table; that is, mapping read or write requests to a logical block 32 in the memory logical block region 30 to read or write operation to the corresponding frame 13 in the flash memory 10 according to step (240).

Through the steps of the above method, the read or write requests to a logical block 32 in the memory logical block region 30 are mapped to read or write operations to the corresponding frame 13 in the flash memory 10. The above steps (200)-(250) are pre-stored in the data access control software of the electronic host connected to the flash memory 10 for data access control, such as personal computer (PC), or the control programs pre-installed in the data access hardware of the flash memory 10, such as the microprocessor of a card reader or control program of a control circuit.

Figure 3:
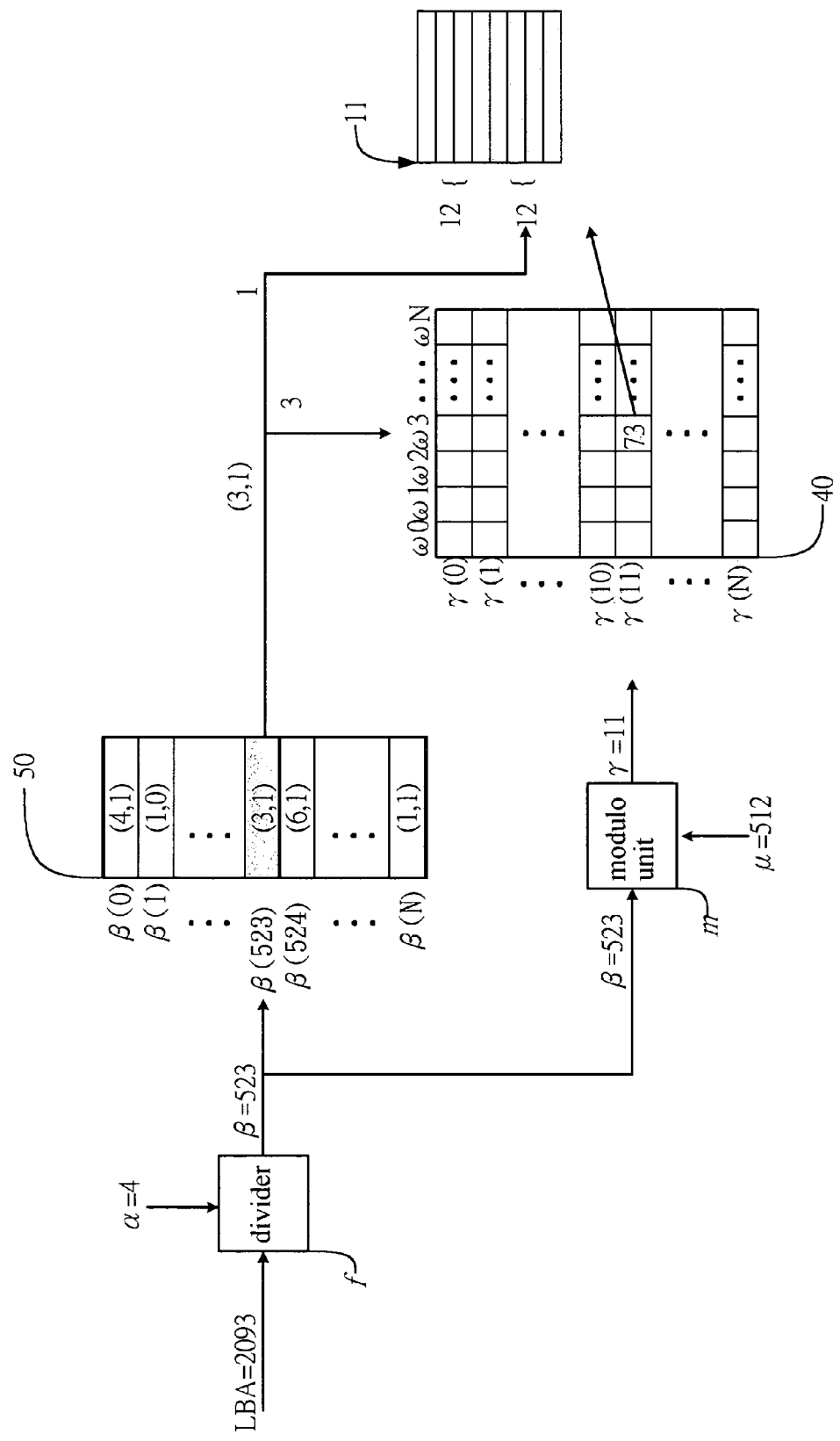
FIG. 3 is mapping relationship between the erase unit table and the cluster table of the present invention.
Figure 4:
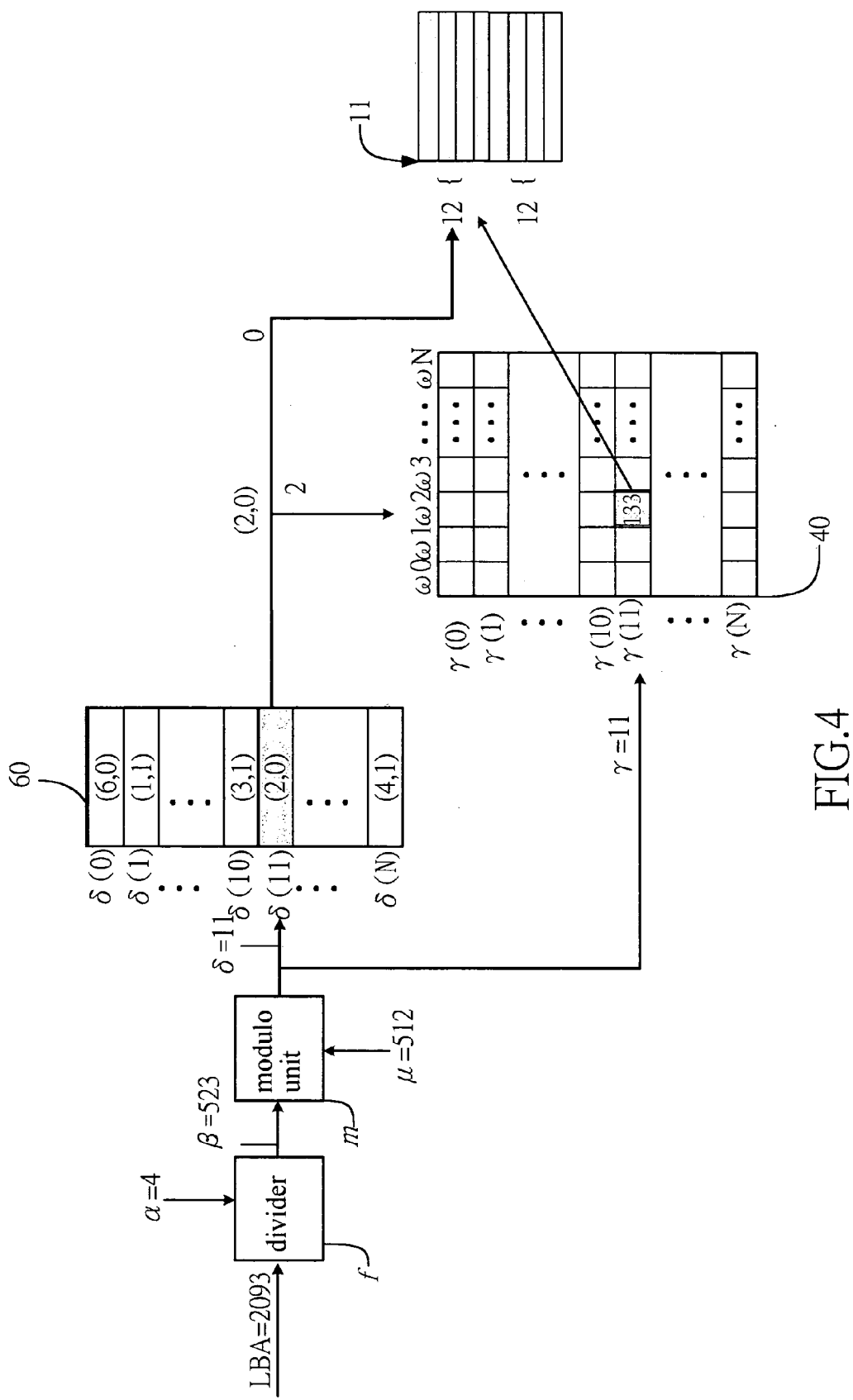
FIG. 4 is a mapping relationship between the erase unit table and free segment table of the present invention.

FIGS. 3 and 4 show the mapping relationship among the erase unit table 40, the cluster table 50 and the free segment table 60 of step (240) during the actual data access to the flash memory 10. The erase unit table 40 records the current mapping between the virtual erase unit 22 of the area 21 of the virtual memory region 20 and the physical erase unit 11 of the flash memory 10. The cluster table 50 records the current information of each cluster 31 of the memory logical block region 30 being stored in which segment 12 corresponding to which virtual erase unit 22 of the area 21 to which the cluster 31 belongs. Because the area 21 to which each cluster 31 belongs, called area number, is equal to the modulo of the cluster number of the cluster 31 divided by the number of the areas 21, it only needs to know which segment 12 corresponding to which virtual erase unit 22 of the area 21 to which the cluster 31 belongs. Through the translation formula and erase unit table 40, it can be known the physical address range of the flash memory 10 which a cluster 31 exists in. The free segment table 60 records one free segment 12 for each area 21, where a free segment 12 consists of at least one free frame 13. The free frame 13 can be used for storing new data. The use of the free segment table 60 allows facilitate the finding of free frame 13 for writing new data quickly.

FIG. 3 shows the read operation through the use of the erase unit table 40 and the cluster table 50 in finding the segment 12 of the flash memory 10 corresponding to the logical block 32 of the memory logical block region 30. With the logical block 32 of the memory logical block region 30, through the erase unit table 40 and the cluster table 50, the physical address range of the corresponding segment 12 of the flash memory 10 can be determined. For example, the LBA of the logical block 32 is 2093, and α is the number of the logical blocks 32 in a cluster 31. In this example, α equals to 4. β is the quotient of the LBA divided by α. In the embodiment of FIG. 3, a divider f is connected between the LBA and the cluster table 50 to obtain β as 523. The divider f can be a division unit implemented with hardware or software. β(0)-β(N) of the cluster table 50 store the byte value ω0-ωN of the corresponding erase unit table 40 and the segment number of the corresponding physical erase unit 11 of the flash memory 10. Byte values ω0-ωN are the horizontal coordination of the erase unit table 40 of FIG. 3. For example, the contents of β(523) are (3, 1), where "3" points to the byte value ω3, and "1" points to the first segment 12 of the corresponding physical erase unit 11, as shown in the shaded area in FIG. 3.

A modulo unit m is connected between the divider f and the erase unit table 40. The two inputs of the modulo unit m are connected to β, the output of the divider f, and μ, the total number of the areas 21, of the virtual memory region 20. The modulo of β divided by μ is the erase unit table entry γ. As the embodiment shown in FIG. 3, β is 523 and μ is 512; therefore, γ is 11. The value of γ equals to 11 means that γ(11) is the corresponding entry among the γ(0)-γ(N) of the erase unit table 40. The byte value ω3 of γ(11) is 73, which points to the 73rd physical erase unit 11 of the flash memory 10. Combined with the "1" pointing to the first segment 12, the data corresponding to β(523) can be found in a frame 13 in the first segment 12 of the 73rd physical erase unit 11 of the flash memory. Then the search operation can be performed to find which frame 13 in this segment 12 stores the data required. After the search operation is done, the read operation can then be performed on the found frame 13.

Similarly, FIG. 4 shows the write operation through the use of the erase unit table 40 and the free segment table 60 in finding the free segment 12 of the corresponding area 21 of the flash memory 10, where the free segment 12 has at least one free frame 13. Divider f and modulo unit m are connected between the LBA of the logical block 32 and the erase unit table 40 and the free segment table 60 in series. For example, the LBA of the logical block 32 is 2093, μ is 512 and α equals to 4. The output of the modulo unit m is the free segment table entry δ and the erase unit table entry γ, and the value of them is 11. The value of δ points to the contents of the δ(11) among the δ(0)-δ(N) of the free segment table 60. For example, the contents of δ(11) are (2, 0), where "2" points to the byte value ω2, and "0" points to the zeroth segment 12 of the physical erase unit 11, as shown in the shaded area in FIG. 3.

In addition, the value of γ points to γ(11) among γ(0)-γ(N) of the erase unit table 40. Combined with the byte value ω2 of the erase unit table 40, the byte value ω2 of γ(11) is 133, which points to the 133rd physical erase unit 11 of the flash memory 10. Again, combined with the zero-th segment 12, a free frame 13 of the zero-th segment 12 of the 133rd physical erase unit 11 of the flash memory 10 can be found for the data to be written to.

Figure 5:
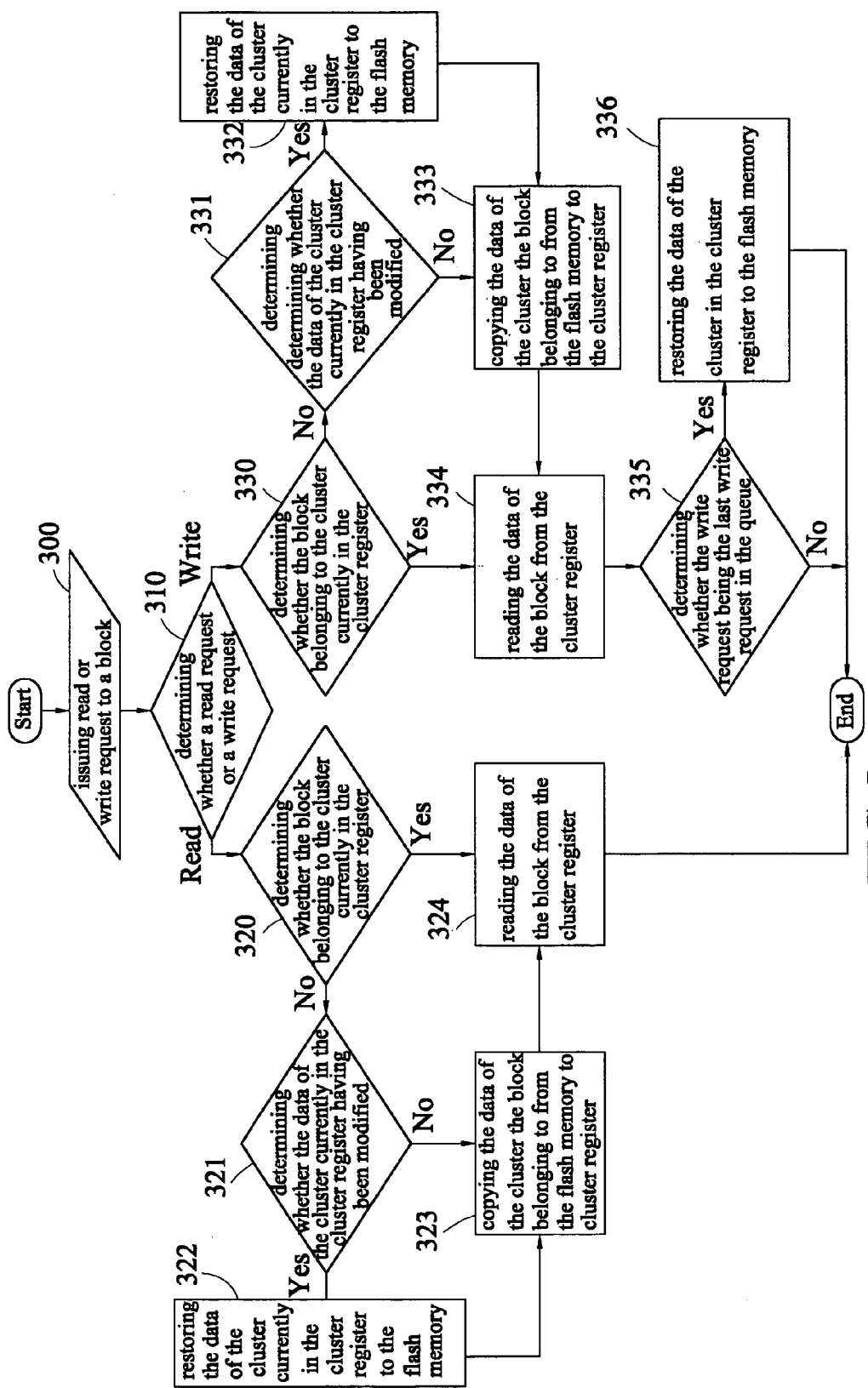
FIG. 5 is a detailed flowchart of the processing data access step of the present invention.

FIG. 5 shows a detailed flowchart of the aforementioned step (250) of establishing a cluster register in the flash memory, including the following steps of:

(300) issuing a read or write request to a logical block 32; that is, the user using the command on an electronic host, such as PC or card reader, connected to the flash memory 10 to issue a data access request;

(310) determining whether it is a read request or a write request, if it is a read request, proceeding to step (320); otherwise, proceeding to step (330);

(320) determining whether the cluster the logical block 32 belonging to is currently in the cluster register; if so, proceeding to step (324); otherwise, proceeding to step (321);

(321) determining whether the data of the cluster currently in the cluster register have been modified; if so, proceeding to step (322); otherwise, proceeding to step (323);

(322) restoring the data of the cluster currently in the cluster register to the flash memory 10;

(323) copying the data of the cluster the logical block 32 belonging to from the flash memory 10 to the cluster register;

(324) reading the data of the logical block 32 from the cluster register;

(325) ending;

(330) determining whether the cluster the logical block 32 belonging to is currently in the cluster register; if so, proceeding to step (334); otherwise, proceeding to step (331);

(331) determining whether the data of the cluster currently in the cluster register have been modified; if so, proceeding to step (332); otherwise, proceeding to step (333);

(332) restoring the data of the cluster currently in the cluster register to the flash memory 10;

(333) copying the data of the cluster the logical block 32 belonging to from the flash memory 10 to the cluster register;

(334) writing the data of the logical block 32 to the cluster register;

(335) determining whether the write request is the last write request in the request queue; if so, proceeding to step (336); otherwise, proceeding to step (325);

(336) restoring the data of the cluster currently in the cluster register to the flash memory 10 and returning to step (325).

With steps (300)-(336) of the construction and use of a cluster register, the time required for performing data access to the flash memory 10 can be shortened in comparison with the methods without the use of a cluster register[T7].

Figure 6:
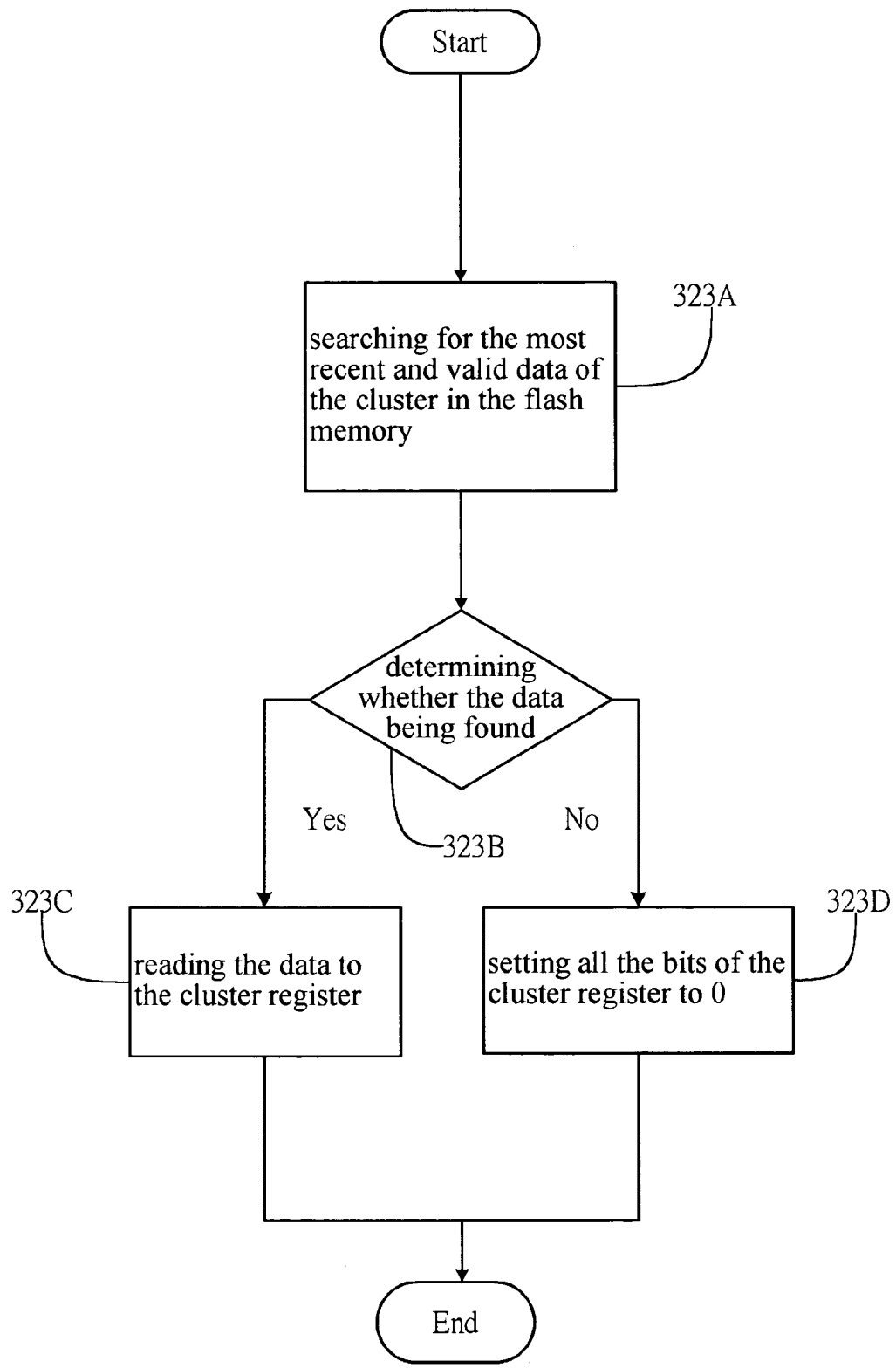
FIG. 6 is a detailed flowchart of step of reading cluster data from the flash memory to the cluster register of FIG. 5 of the present invention.

FIG. 6 shows a detailed flowchart of step (323) and step (333) of FIG. 5, comprising the following steps:

(323A) searching for the most recent and valid data of the cluster in the flash memory 10;

(323B) determining whether the data is found; if so, proceeding to step (323C); otherwise proceeding to step (323D);

(323C) copying the data to the cluster register;

(323D) setting all the bits of the cluster register to 0.

Figure 7:
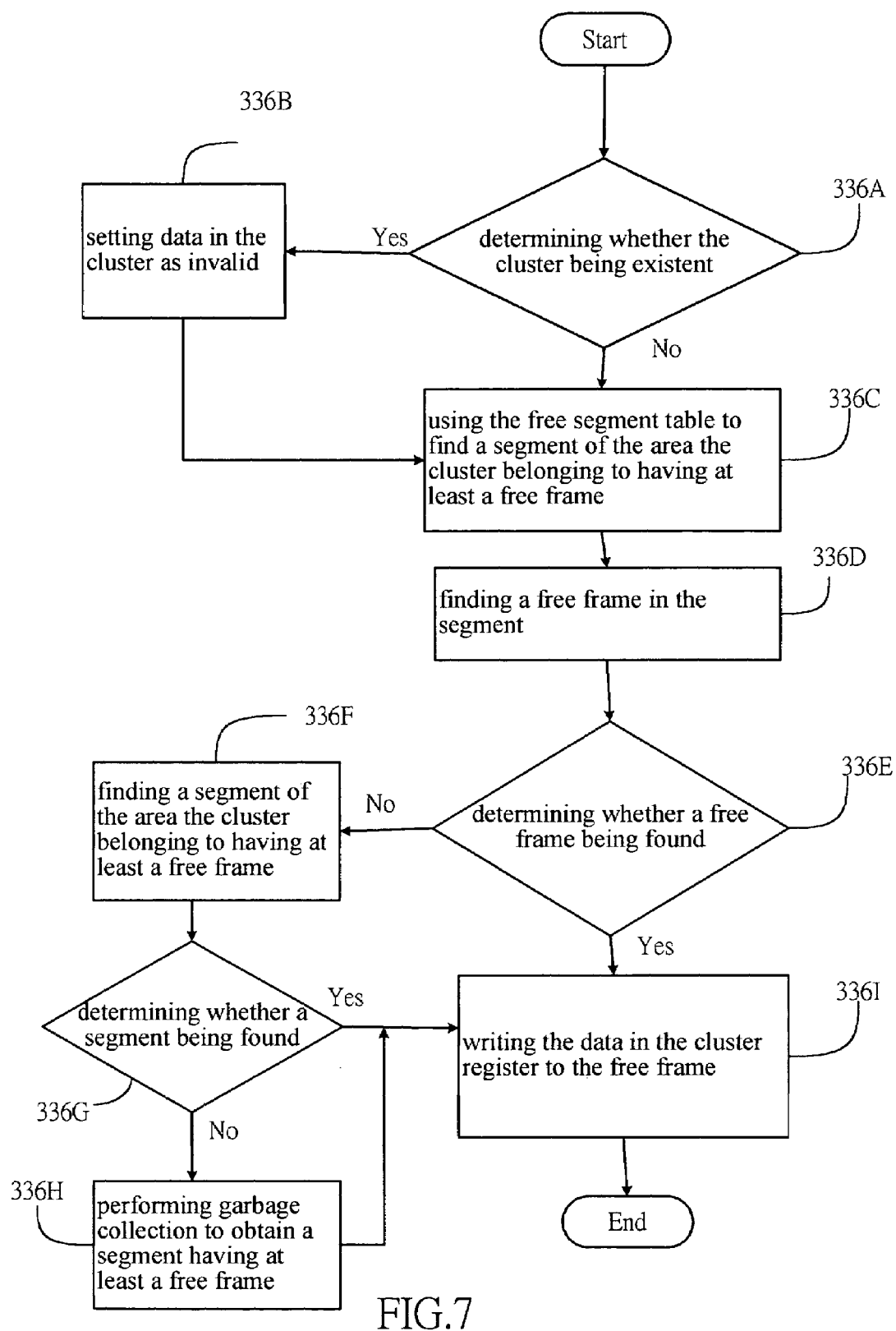
FIG. 7 is a detailed flowchart of the step of writing cluster data stored in the cluster register to the free frame found in the flash memory of FIG. 5 of the present invention.

FIG. 7 shows a detailed flowchart of step (322), step (332) and step (336) of restoring data of the cluster 31 in the cluster register to the flash memory 10, as shown in FIG. 5, comprising the following steps:

(336A) determining whether the cluster is existent; if so, proceeding to step (336B); otherwise, proceeding to step (336C);

(336B) setting data in the cluster as invalid;

(336C) using the free segment table 60 to find a segment 12 of the area 21 the cluster belonging to having at least a free frame 13;

(336D) finding a free frame 13 in the segment 12;

(336E) determining whether a free frame 13 is found; if so, proceeding to step (336I); otherwise, proceeding to step (336F);

(336F) finding a segment 12 of the area 21 the cluster belonging to having at least a free frame 13;

(336G) determining whether a segment 12 is found; if so, proceeding to step (336I); otherwise, proceeding to step (336H);

(336H) performing garbage collection to obtain a segment 12 having at least a free frame 13;

(336I) writing the data in the cluster register to the free frame 13.

With the above description accompanying FIGS. 1-7, it is shown that the number of clusters decreases when the size of the cluster 13 increases while the size of the flash memory 10 remains the same. This also reduces the size of the cluster table 50. Similarly, when the size of the area 21 increases, the number of the areas 21 decreases, and the size of the free segment table 60 also decreases. If the size of the segment 12 increases or the size of the area 21 decreases, the number of the segments 12 in an area 21 decreases, and the sizes of the cluster table 50 and the free segment table 60 also decrease. Therefore, the memory consumption and the data access efficiency of the flash memory 10 can be controlled through reconfiguration of the system parameters.

Furthermore, in a file system, a read or write request is made to a logical block 32. However, in the present invention, a read or write operation is made to a cluster 31. Because the size of the logical block 32 is usually smaller than the size of the cluster 31, this degrades the performance of the data access. Therefore, the use of the cluster register as shown in FIGS. 5-7 allows all the read or write operations to the cluster register, which improves the data access efficiency of the flash memory 10.

While the invention has been described in connection with what is presently considered to the most practical and preferred embodiment, it is to be understood that the invention is not to be limited to the disclosed embodiment, but on the contrary, is intended to cover various modifications and equivalent arrangement included within the spirit and scope of the appended claims.

What is claimed is:

1. A method for configuration and management of flash memory, comprising the following steps:
    (a) defining a relationship among a flash memory, a virtual memory region, and a memory logical block region according to a logical block address of the write request to said flash memory;
    (b) defining a plurality of data access basic control units of said flash memory, including physical erase unit, segment, frame, and page, by configuring the structure of said flash memory of step (a) into said physical erase unit, said segment, said frame and said page;
    (c) defining a plurality of data access basic control units of the virtual memory region, including virtual erase unit and area, by configuring the structure of said virtual memory region of step (a) into said area and said virtual erase unit;
    (d) defining a plurality of data access basic control units of the memory logical block region, including cluster and logical block, by configuring the structure of said memory block region of step (a) into said cluster and said logical block;
    (e) constructing an erase unit table, a cluster table and a free segment table according to a relationship among the physical erase unit, segment, virtual erase unit, area, logical block and cluster, by using said physical erase unit, said segment of step (b), said area, said virtual erase unit of step (c), said cluster, said logical block of step (d) to construct said erase unit table, said cluster table and said free segment table; and
    (f) processing data access according to a relationship in said erase unit table, said cluster table, and said free segment table, by using said erase unit table, said cluster table and said free segment table of step (e) to map a read or write request to said logical block of said memory logical block region to a read or write operation to said frame of said flash memory.

2. The method as claimed in claim 1, wherein the relationship between said area and said cluster of step (e) is an area number equal to the modulo of a cluster number divided by the number of said areas.

3. The method as claimed in claim 1, wherein a divider is connected between said logical block address of said logical block and said cluster table of step (e), and a modulo unit is connected between said erase unit table and said divider.

4. The method as claimed in claim 1, wherein a divider and a modulo unit are connected in series between said logical block address of said logical block and said erase unit table, said free segment table of step (e).

5. The method as claimed in claim 1, wherein step (f) is to construct a cluster register in said flash memory, further comprising the following steps:
- (f1) issuing read or write request to a logical block;
- (f2) determining whether said request is a read request or a write request, if it is a read request, proceeding to step (f3); otherwise, proceeding to step (f9);
- (f3) determining whether the cluster said logical block belonging to is currently in said cluster register; if so, proceeding to step (f7); otherwise, proceeding to step (f4);
- (f4) determining whether the data of said cluster currently in said cluster register have been modified; if so, proceeding to step (f5); otherwise, proceeding to step (f6);
- (f5) restoring said data of said cluster currently in said cluster register to said flash memory;
- (f6) copying said data of said cluster said logical block belonging to from said flash memory to said cluster register;
- (f7) reading the data of said logical block from said cluster register;
- (f8) ending;
- (f9) determining whether the cluster said logical block belonging to is currently in said cluster register; if so, proceeding to step (f13); otherwise, proceeding to step (f10);
- (f10) determining whether the data of said cluster currently in said cluster register have been modified; if so, proceeding to step (f11); otherwise, proceeding to step (f12);
- (f11) restoring said data of said cluster currently in said cluster register to said flash memory;
- (f12) copying said data of said cluster said logical block belonging to from said flash memory to said cluster register;
- (f13) writing said data of said logical block to said cluster register;
- (f14) determining whether said write request is the last write request in the request queue; if so, proceeding to step (f15); otherwise, proceeding to step (f8); and
- (f15) restoring said data of said cluster currently in said cluster register to said flash memory and returning to step (f8).

6. The method as claimed in claim 5, wherein step (f6) and step (f12) further comprise the following steps:
- (f6a) searching for the most recent and valid data of said cluster in said flash memory;
- (f6b) determining whether said data is found; if so, proceeding to step (f6c); otherwise proceeding to step (f6d);
- (f6c) copying said data to said cluster register; and
- (f6d) setting all the bits of said cluster register to 0.

7. The method as claimed in claim 5, wherein step (f5), step (f11) and step (f15) further comprise the following steps:
- (f15a) determining whether said cluster is existent; if so, proceeding to step (f15b); otherwise, proceeding to step (f15c);
- (f15b) setting said data in said cluster as invalid;
- (f15c) using said free segment table to find a segment of said area said cluster belonging to having at least a free frame;
- (f15d) finding a free frame in said segment;
- (f15e) determining whether said free frame is found; if so, proceeding to step (f15i); otherwise, proceeding to step (f15f);
- (f15f) finding a segment of said area said cluster belonging to having at least a free frame;
- (f15g) determining whether said segment is found; if so, proceeding to step (f15i); otherwise, proceeding to step (f15h);
- (f15h) performing garbage collection to obtain a segment having at least a free frame; and
- (f15i) writing said data in said cluster register to said free frame.

* * * * *